US012757309B2

(12) United States Patent
Gerow et al.

(10) Patent No.: US 12,757,309 B2
(45) Date of Patent: Oct. 6, 2026

(54) LIGHTING CONTROL SYSTEM CONFIGURABLE BY MOBILE DEVICE

(71) Applicant: Building Robotics, Inc., Santa Clara, CA (US)

(72) Inventors: Nicholas Gerow, Kitchener (CA); Michael N Gershowitz, Cape Coral, FL (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 19/081,734

(22) Filed: Mar. 17, 2025

(65) Prior Publication Data

US 2026/0282199 A1 Sep. 17, 2026

(51) Int. Cl.

| | |
|---|---|
| ***H05B 47/175*** | (2020.01) |
| ***H05B 47/11*** | (2020.01) |
| ***H05B 47/155*** | (2020.01) |
| ***H05B 47/195*** | (2020.01) |

(52) U.S. Cl.

CPC ........... *H05B 47/199* (2024.01); *H05B 47/11* (2020.01); *H05B 47/155* (2020.01); *H05B 47/195* (2020.01); *H05B 47/1965* (2024.01)

(58) Field of Classification Search

CPC .. H05B 47/19; H05B 47/105; H05B 47/1965; H05B 47/115; H05B 47/196; H05B 47/1985; H05B 47/199; H05B 47/11; H05B 47/18; H05B 47/1995; H05B 45/10

See application file for complete search history.

(56) References Cited

U.S. PATENT DOCUMENTS

| | | | | |
|---|---|---|---|---|
| 9,192,019 B2 | 11/2015 | Huizenga et al. | | |
| 9,549,451 B2 | 1/2017 | Saes | | |
| 9,618,915 B2 | 4/2017 | Mohan et al. | | |
| 9,888,548 B2 | 2/2018 | Huizenga et al. | | |
| 10,111,308 B2 | 10/2018 | Huizenga et al. | | |
| 10,206,269 B2 | 2/2019 | Wagoner et al. | | |
| 10,383,200 B1 | 8/2019 | Romano et al. | | |
| 2008/0265799 A1* | 10/2008 | Sibert | .................... | H05B 47/12 315/292 |
| 2009/0132070 A1* | 5/2009 | Ebrom | .................... | H05B 6/688 700/90 |

(Continued)

FOREIGN PATENT DOCUMENTS

EP 3935791 B1 11/2024

*Primary Examiner* — Wei (Victor) Y Chan

(57) ABSTRACT

A commissioning and configuration for a lighting control system of a building environment comprises a mobile device and a directional device. The directional device directs a directional link to a select sensor device. The select sensor device is either a first sensor device or a second sensor device located in a particular area of the building environment. The mobile device connects to the first sensor device via a wireless communication link, receives a response message from the select sensor device via the wireless communication link in response to the directional device directing the directional link to the select sensor device. The mobile device associates the select sensor device with a device group corresponding to the particular area based on the response message. The mobile device configures a communication and operational parameter for a sensor network including the sensor devices as a group.

19 Claims, 4 Drawing Sheets

(56) References Cited

U.S. PATENT DOCUMENTS

| | | | | |
|---|---|---|---|---|
| 2009/0218951 | A1 * | 9/2009 | Weaver .................. | H04N 23/71<br>315/315 |
| 2009/0236910 | A1 * | 9/2009 | Yamada ................. | G08C 23/04<br>315/154 |
| 2010/0052939 | A1 * | 3/2010 | Liang ..................... | G08C 17/02<br>455/556.2 |
| 2013/0181813 | A1 | 7/2013 | Norlen | |
| 2016/0302288 | A1 | 10/2016 | Gotoh et al. | |

* cited by examiner

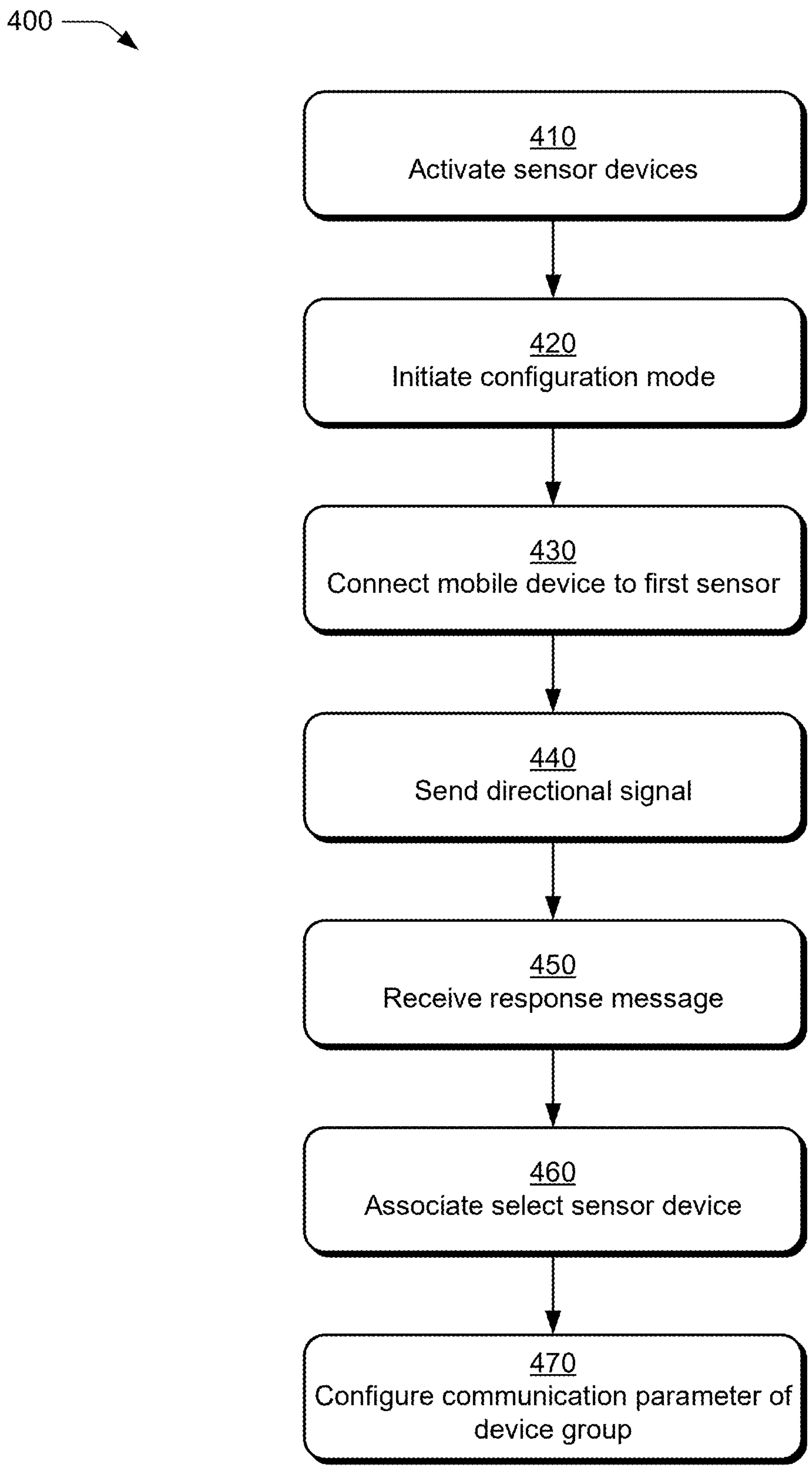
400
410
Activate sensor devices
420
Initiate configuration mode
430
Connect mobile device to first sensor
440
Send directional signal
450
Receive response message
460
Associate select sensor device
470
Configure communication parameter of device group

LIGHTING CONTROL SYSTEM CONFIGURABLE BY MOBILE DEVICE

FIELD OF THE INVENTION

This application generally relates to the field of lighting control systems and, more particularly, systems and methods for configuring lighting control for a building environment.

BACKGROUND

Lighting control systems provide the capability of managing lighting devices for building environments. These lighting devices include light fixtures, switches, cables, and power sources. The lighting control systems provide operational benefits to building operators and occupants.

Lighting controls for building environments may be challenging to install and configure. In particular, an existing building environment may not have the necessary wiring in order to interconnect lighting devices, and installation of the necessary wiring may be difficult and expensive. For example, a switch for a lighting control system may provide additional functionality for controlling light fixtures and, as a result, require new or additional wiring to support these new functions. Thus, upgrading generally necessitates the removal of existing systems and installation of new hardware.

For existing building environments, wireless lighting systems may be advantageous over wired lighting systems for expanding components and upgrading capabilities. Even so, conventional wireless lighting systems have their limitations. Wireless systems typically have a local-based or cloud-based controlling device that communicates with lighting devices via wireless communications. These wireless systems require the purchase and installation of the controlling device, and they may also require purchase and installation of gateways and/or other components to communicate between devices. However, installation and configuration of lighting devices for a wireless lighting system are challenging, particularly for complex functions such as grouping and synchronizing light devices for coordinated use and monitoring.

SUMMARY

As described herein, there is provided a technique for configuring a lighting control system of a building environment. A mobile device communicates wirelessly with sensor devices that control light fixtures. The lighting control system may be configured by operation of the mobile device in combination with a directional signal transmission individually to each lighting device. For example, lighting devices may be commissioned or decommissioned from a particular device group by strobing a light beam at a sensor of each lighting device. In particular, lighting devices may be easily grouped and their network communications may be configured as a group to facilitate commissioning of the system and to assure uniform and synchronized operation of lighting devices in that group.

One aspect is a lighting control system of a building environment comprising a directional device and a mobile device. The directional device directs a directional link to a select sensor device of multiple sensor devices. The select sensor device is either a first sensor device or a second sensor device of the sensor devices located in a particular area of multiple areas of the building environment. The mobile device connects to the first sensor device of the sensor devices via a wireless communication link. The mobile device receives a response message from the select sensor device to the mobile device via at least in part by the wireless communication link in response to the directional device directing the directional link to the select sensor device. The mobile device associates the select sensor device with a device group corresponding to the particular area based on the response message. The mobile device configures a communication parameter for a sensor network including the sensor devices as a group in response to associating the sensor devices with the device group.

Another aspect is a method for configuring the lighting control system of the building environment. A mobile device and a first sensor device of multiple sensor devices located in a particular area of multiple areas are connected via a wireless communication link. A directional link is directed by a directional device to a select sensor device of the sensor devices subsequent to connecting the mobile device and the first sensor device via the wireless communication link. The select sensor device is either the first sensor device or a second sensor device of the sensor devices located in the particular area of the areas. A response message is received by the mobile device from the select sensor device via, at least in part, by the wireless communication link in response to the directional device directing the directional link to the select sensor device. The select sensor device is associated, by the mobile device, with a device group corresponding to the particular area based on the response message. A communication parameter for a sensor network including the sensor devices configured as a group by the mobile device in response to associating the sensor devices with the device group.

Yet another aspect is a mobile device for configuring a lighting control system of a building environment comprising a communication component and a controller coupled to the communication component. The communication component has a wireless communication link with a first sensor device of multiple sensor devices. The communication component receives a response message from a select sensor device of the sensor devices via, at least in part, by the wireless link. The communication component receives the response message in response to a directional device directing a directional link to the select sensor device. The select sensor device is either the first sensor device or a second sensor device of the sensor devices located in a particular area of multiple areas. The controller associates the select sensor device with a device group corresponding to the particular area based on the response message. The controller configures a communication parameter for a sensor network including the sensor devices as a group in response to associating the sensor devices with the device group.

Still another aspect is a system and method for configuring a lighting control system of a building environment. A directional link is directed from a directional device to a select sensor device of multiple sensor devices subsequent to activating the select sensor device. A response message is received from the select sensor device to a system hub in response to directing the directional link to the select sensor device via the directional link. The system hub may be an energy manager, a Cloud system, or a lighting control device. The system hub associates the select sensor device with a device group corresponding to the particular area based on the response message. The system hub configures a communication parameter for a sensor network including the multiple sensor devices as a group in response to associating the sensor devices with the device group.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 4 is a flow diagram depicting an example operation of the lighting control system of FIG. 1.

DETAILED DESCRIPTION

To facilitate an understanding of embodiments, principles, and features of the present invention, they are explained hereinafter with reference to implementation in illustrative embodiments. In particular, they are described in the context of a system and method for configuring lighting control for a building environment. Embodiments of the present invention, however, are not limited to use in the described systems, devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

The lighting control system of the building environment may be configured to maximize building management performance with regard to occupant comfort, energy usage, and/or visual aesthetics. Although the lighting control system may operate in coordination with a larger lighting network of multiple environments, the lighting control system described herein is capable of operating independent of any external management devices/servers and their associated gateways. The lighting control system may be configured with a mobile device, a direction device (such as a light or laser pointer), and a sensor device corresponding to each light fixture in the building environment. For example, the mobile device and the directional device may be used to program the lighting control system during initial commissioning and programming or subsequent programming changes to change functional behavior. The lighting control system may be configured by operation of the mobile device in combination with a directional signal transmitted to each lighting device.

Figure 1:
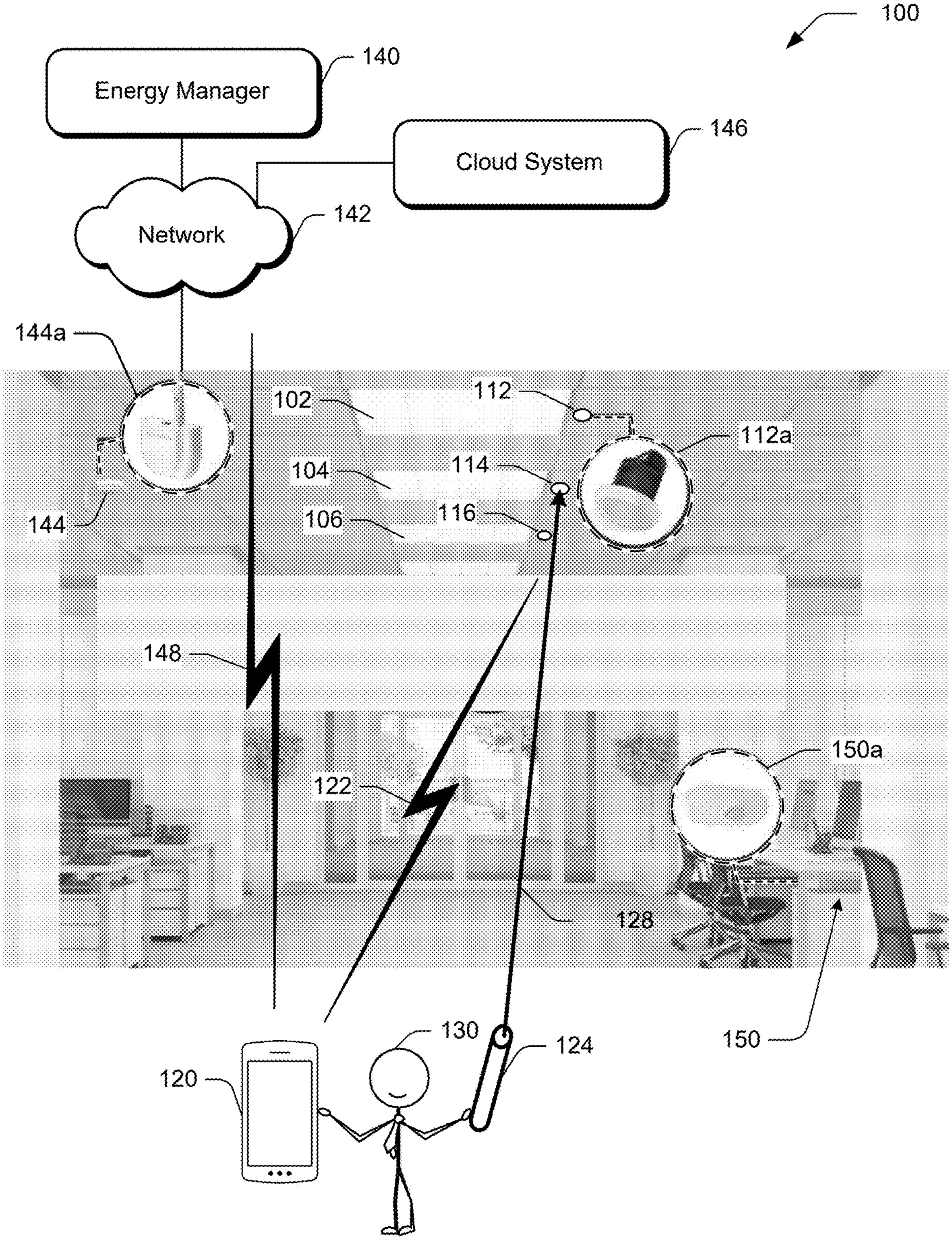
FIG. 1 is an illustration of a lighting control system in an example implementation that may be operable to employ techniques described herein.

FIG. 1 is an illustration of a building environment in an example implementation of the lighting control system 100. The lighting control system 100 includes multiple light fixtures 102-106 located throughout the building environment to provide illumination, a sensor device 112-116 corresponding to each light fixture, a mobile device 120 located remote from the sensor devices within the building environment, and a directional device 124 being co-located with the mobile device in proximity to at least one sensor device. Each sensor device 112-116 may be associated with a device group that identifies the sensor devices 112-116 that may be controlled, at least in part, by the mobile device 120. The device group might not include any sensor devices 112-116, such as a situation where all sensor devices are not yet commissioned (i.e., uncommissioned) at a building environment. The device group might include all sensor devices 112-116 within a particular area of the building environment, such as a room, compartment, partitioned area, or other designated grouping of the sensor devices. The device group might include some sensor devices 112-116 but not others.

Similar to the light fixtures 102-106, multiple sensor devices 112-116 may be located throughout the building environment, in which each sensor device corresponds to a particular light fixture. For example, a first sensor device 114 may correspond to a first light fixture 104, a second sensor device 112 may correspond to a second light fixture 102, and a third sensor device 116 may correspond to a third light fixture 106. Each sensor device 112-116 connects with a light fixture 102-106 corresponding to the sensor device to control the power flowing through, or otherwise control, the corresponding light fixture.

The sensor devices 112-116 includes sufficient electronic intelligence to control the corresponding light fixture 102-106 directly and, if desired, other building management functions such as, but not limited to, beaconing, indoor location determination, and real estate utilization analytics. Sensor devices 112-116 may provide information to other devices of the lighting control system 100 to facilitate adjustments to light levels based on occupancy, task tuning, daylight harvesting, and configurable lighting profiles for rooms, open spaces, hallways, and the like. As shown in FIG. 1, an enlarged view 112*a* of the second sensor device 112 illustrates a sensor body and a sensor surface positioned at one end of the sensor body. The sensor device 112-116 may be installed at a structural support of the building environment. For example, the sensor body of the sensor device 112-116 may be embedded at a building surface (e.g., ceiling or wall) while the sensor surface may be exposed, or partially exposed, at the building surface. By positioning the sensor surface at a more exposed position in the building environment relative to the remainder of the lighting device 106, sensor components of the sensor device 112-116 are positioned for optimal reception of wireless (e.g., light, radio frequency, and the like) signals from other devices positioned in the building environment.

As stated above, the lighting control system 100 includes a mobile device 120 located remote from the sensor devices 112-116 within the building environment. Examples of mobile devices 120 include, but are not limited to, smartphones, tablets, laptops, handheld computers, e-readers, smartwatches, personal digital assistants, and personal area network devices. The mobile device 120 may be positioned anywhere within communication proximity to the sensor devices 112-116 to communicate with the sensor device. For example, the mobile device 120 may roam with a device user 130 from area-to-area of the building environment. The mobile device 120 communicates wirelessly with the sensor devices 112-116 via a wireless communication link 122 that manage illumination for the building environment and communicate with each other or other sensor devices within a sensor network.

The lighting control system 100 further includes a directional device 124 co-located with the mobile device 120. The sensor devices 112-116 may be easily commissioned at a building environment, such as a room, by simply directing or pointing the directional device 124 toward a sensor device 112-116 within line of sight of the directional device. The directional device 124 directs a directional link 128, such as a light beam, to a select sensor device 114 of multiple sensor devices 112-116, the select sensor device 114 being one the sensor devices 112-116 located in a particular area of the multiple areas of the building environment.

Also, the mobile device 120 may be associated with the directional device 124. In particular, the mobile device 120 may be co-located with the directional device 124. For some embodiments, the mobile device 120 and the directional device 124 may be located in the same area of the building environment, such as a room, compartment, partitioned area, or other designated area. For embodiments where the mobile device 120 and the directional device 124 are co-located or located in the same area, the mobile device and the directional device may be operated by the same person or different people. For some embodiments, the mobile device 120 and the directional device 124 may be within proximity, such as on the person or within reach, of the device user 130 such that both devices may be held simultaneously. For some embodiments, a single device may include the mobile device 120 and the directional device 124 such that both devices are supported by the housing of the single device.

Any type of directional device 110 may be used so long as the receiving sensor device 112-116 has a sensor that may receive and recognize the signal, i.e., light beam, provided by the directional device. Examples of directional devices include, but are not limited to, dedicated devices or mobile devices that utilize light-based technology within the light spectrum, including visible light, infrared light, and ultraviolet light. For example, one form of dedicated device 110 is a laser pointer that generates a light signal based on visible light, such as a green laser having a classification of Class 2 or higher.

The sensor device 112-116 may recognize the directional link 128 as well as other types of illumination. For this reason, cost and efficiency advantages may be recognized due to this capability of being used for multiple purposes. The sensor device 112-116 would not need a dedicated component to recognize the light beam provided by a directional device 124 if an existing component of the sensor device used for detecting light levels may detect the signal from the direction device as well. For example, the sensor device 112-116 may include an ambient daylight sensor capable of receiving and recognizing ambient light levels of the particular area proximal to the sensor device for the lighting control system as well as the light beam from the directional device 124.

Although not required, an energy manager 140 may be added to the lighting control system 100. The energy manager 140 may communicate with the lighting control system 100 by one or more communication links that utilized wired and/or wireless technologies. The energy manager 140 may be an on-premises server communicating directly, or a remote service communicating via a cloud or network 142, with the lighting control system 100. For some embodiments, the energy manager 140 may communicate with devices of the lighting control system 100 through one or more gateways 144 located in the building environment. As shown in FIG. 1, an enlarged view 144*a* of the gateway device 144 illustrates a gateway body and a gateway antenna positioned at the gateway body. Also, one or more devices of the lighting control system 100, such as the mobile device 120 or the sensor device 112-116, may operate as the energy manager 140 for managing other devices of the building environment. The energy manager 140 may provide various functions and services for optimizing the performance of the lighting control system 100. For example, the energy manager 140 may store, perform analysis, and provide visual reporting of sensor data. The energy manager may provide a secure web-based interface to monitor, manage, and analyze energy savings and other data collected by the sensor network, as well as translate data from the sensor network into detailed energy, temperature, and occupancy insights.

The sensor devices 112-116 of the lighting control system 100 include other types of devices that may not be conveniently accessible by the device user 130. For some embodiments, the sensor devices may include a surface device 150 placed under an open-office workspace that detects when the workspace is in use. The surface device 150 may also provide the device user 130 with real-time information about workspace availability and condition. As shown in FIG. 1, an enlarged view 150*a* of the surface device 144 illustrates a surface device body and a surface device lens positioned at one side of the surface device body.

The lighting control system 100 may includes a Cloud system 146 that communicates with the mobile device 120 via a Cloud communication link 148. The Cloud communication link 148 may be used in conjunction with, or in the alternative to, the wireless communication link 122 (using the same or different communication mechanism). The Cloud system 146 may receive data collected by the mobile device 120 about the sensor devices 112-116, 150 and configurations selected at the mobile device. The Cloud system may backup the data in case there is an issue with the mobile device 120, allow transfer of the data to another mobile device (such as change of ownership), allow a support team to access the data to provide support to the mobile device having issues, and/or allow multiple mobile devices to access the data concurrently. The Cloud communication link 148 may utilize various forms of wired and wireless communication technology as described herein, such as the technologies described for the sensor device 112-116 and the mobile device 120.

Figure 2:
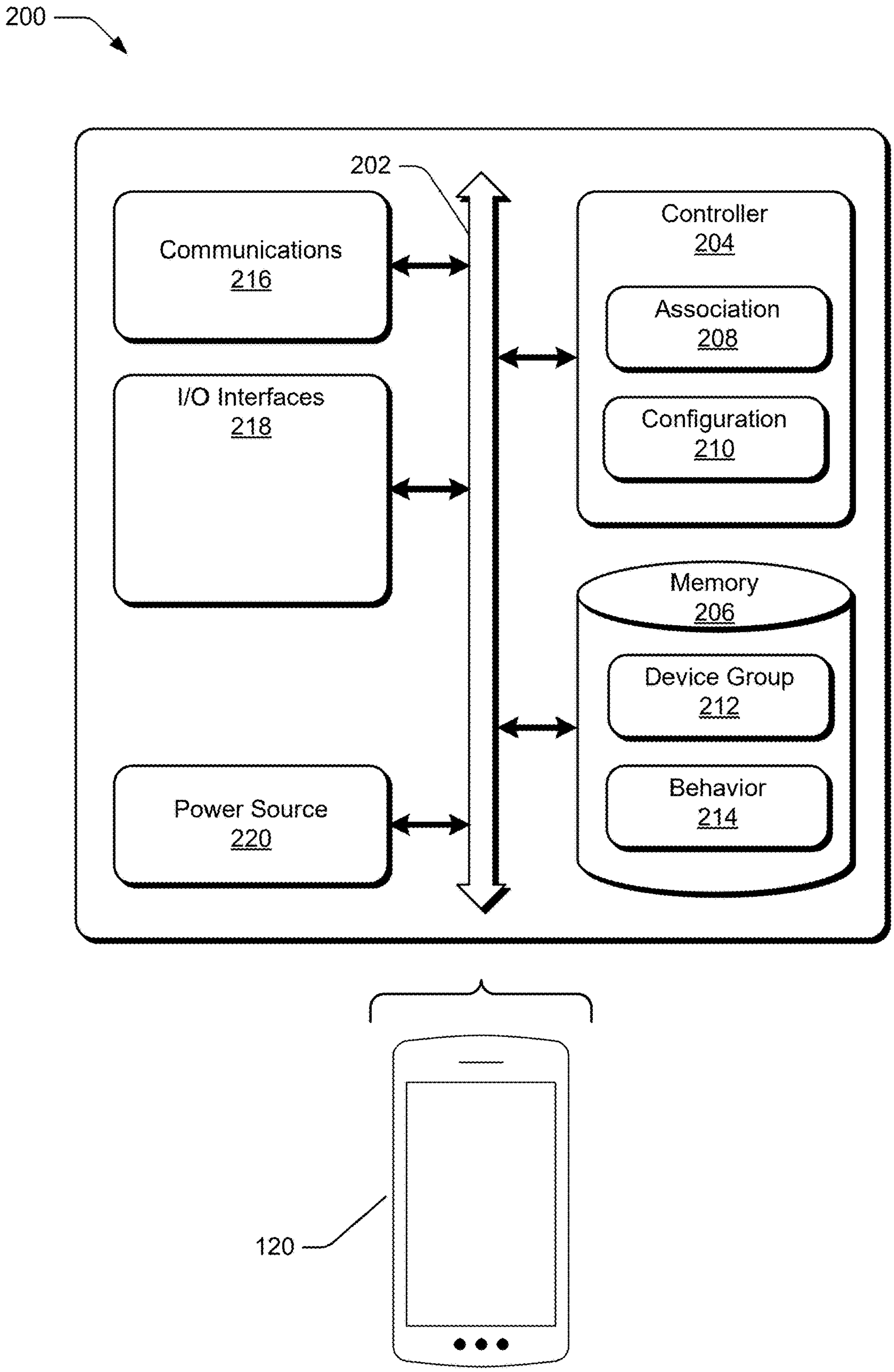
FIG. 2 is a block diagram depicting an example implementation of the mobile device of FIG. 1.

Referring to FIG. 2, there is shown a block diagram of example device components 200 of the mobile device 120. The device components 200 comprise a communication bus 202 for interconnecting other device components directly or indirectly. The other device components include one or more processors or controllers 204 and one or more memory components 206.

The controller or controllers 204 may execute code and process data received from other components of the device components 200, such as information stored at the memory component 206. The code associated with the system 100 and stored by the memory component 206 may include, but is not limited to, operating systems, applications, software modules, drivers, APIs, and the like. An operating system includes executable code that controls basic functions, such as interactions among the various components of the device components 200, communication with external devices, and storage and retrieval of code and data to and from the memory component 206.

Each application includes executable code to provide specific functionality for the controller 204 and/or remaining components of the mobile device 120. Examples of applications executable by the controller 204 include, but are not limited to, an association module 208 and a configuration module 210. The association module 208 associates a select sensor device with a device group corresponding to a particular area of the building environment based on a response message received from a sensor device. The configuration module 210 configures a behavior of sensor devices located in a particular area of the building environment as a group in response to associating the sensor devices with the device group.

Data stored at the memory component 206 are information that may be referenced and/or manipulated by an operating system or application for performing functions of the mobile device 120. Examples of data associated with the system 100 and stored by the memory component 206 may include, but are not limited to, device group data 212 and behavior data 214. The device group data 212 includes information about sensor devices of the lighting control system associated with a particular device group based on messages from sensor devices and associated areas of the building environment. The behavior data 214 includes information about the operation of sensor devices located in a particular area of the building environment based on the associated device group. For some embodiments, the behavior data includes a channel and network identification for wireless communications within a sensor network. For some embodiments, the behavior data includes a determined parameter for wireless communications within a sensor network for a second wireless communication link of the sensor network different from a first wireless communication link between the mobile device and a first sensor device.

The device components 200 include one or more communication components 216 for communicating with other entities via a wired or wireless network. The communication component 216 communicates (i.e., receives and/or transmits) data associated with one or more devices of the system 100 and its associated devices. The communication component 216 may utilize wired or wireless technology for communication. In particular, the communication component 216 provides the mobile device 120 with the capability of communication with the first sensor device 114 via the wireless communication link 122. The wireless communication link 122 may be any type wireless communication based on wireless communication technologies such as, but not limited to, cellular-based communication technology, Bluetooth (including BLE), ultrawide band (UWB), Wi-Fi (including Wi-Fi Direct), Zigbee, cellular, mesh networks, PAN, WPAN, WAN, near-field communications, and other types of radio communications and their variants. For example, the mobile device 120 may connect to the first sensor device 114 via BLE.

The mobile device 120 further includes I/O interfaces 218 and a power source 220. The I/O interfaces 218 of the device components 200 may include one or more input components and/or one or more output components. The I/O interfaces 218 may include a user interface for visual, audio, and/or mechanical interaction with the device user 130 of the mobile device 220. The user interface may include a combination of hardware and software to provide a user with a desired user experience. The power source 220 may be any type of standard power source for a mobile device 120, such as a rechargeable battery.

It is to be understood that FIG. 2 is provided for illustrative purposes only to represent examples of the device components 200 of the mobile device 120 and is not intended to be a complete diagram of the various components that may be utilized by the system 100. Therefore, the mobile device 120 may include various other components not shown in FIG. 2, may include a combination of two or more components, or a division of a particular component into two or more separate components, and still be within the scope of the present invention.

Figure 3:
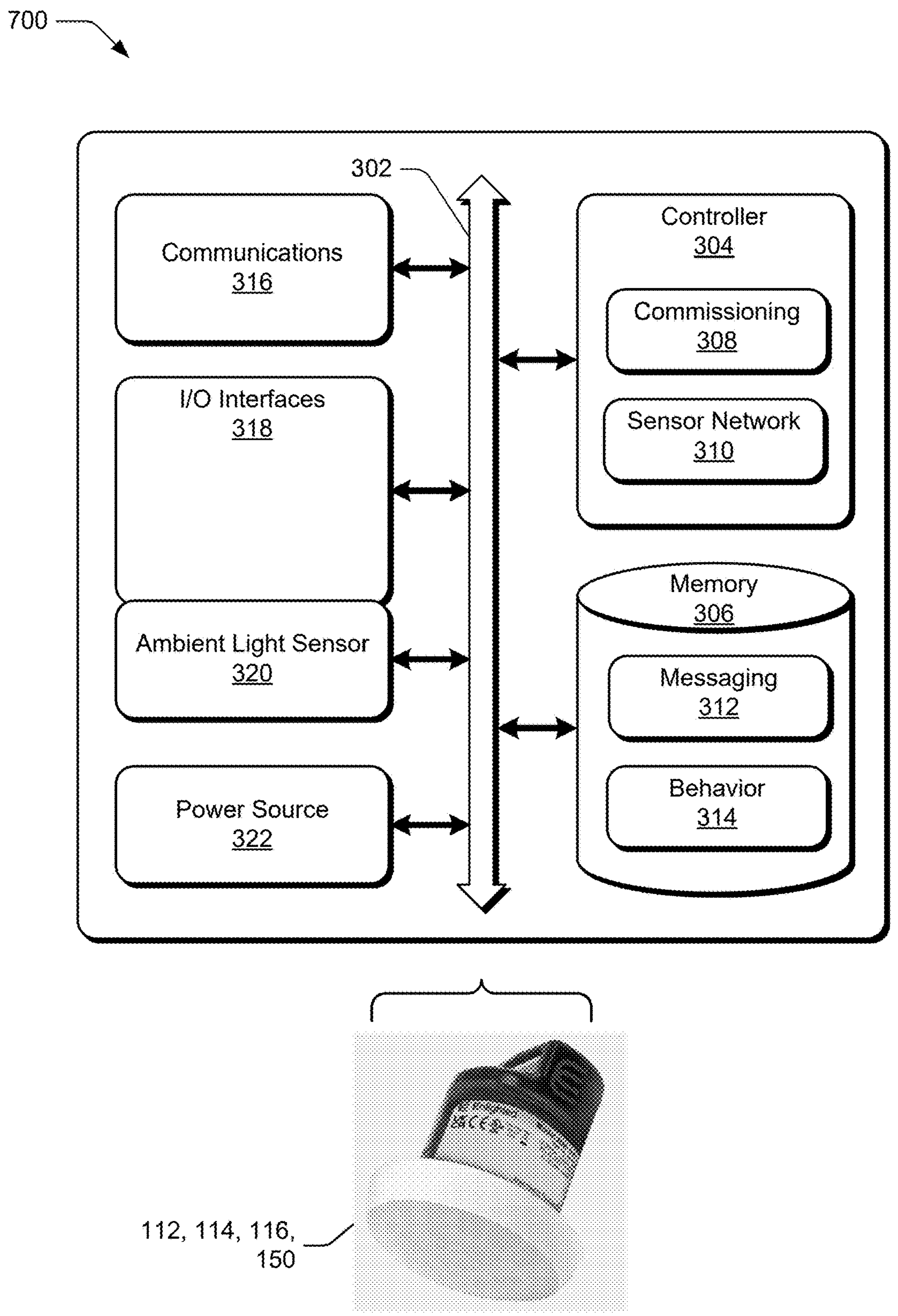
FIG. 3 is a block diagram depicting an example implementation of the sensor device of FIG. 1.

Referring to FIG. 3, there is shown a block diagram of example sensor components 300 of each sensor device 112-116 and, if available, the surface sensor 150. The sensor components 300 comprise a communication bus 302 for interconnecting other device components directly or indirectly, such as the mobile device 120 and the sensor network of sensor devices 112-116, 150. The sensor devices 112-116, 150 includes one or more controllers 304, one or more memory components 306, one or more communication components 316, input/output (I/O) interfaces 318, and a power source 322.

The communication component 316 of the sensor components 300 may utilize various forms of wireless communication technology including, but not limited to, IEEE 802.11 (Wi-Fi), IEEE 802.16 (WiMAX), and IEEE 802.15 (WPAN) including Bluetooth®, BLE, and ZigBee 802.15.4 (The "Bluetooth" word mark and logos are registered trademarks owned by Bluetooth SIG, Inc.). The communication component 316 may also utilize wired technology for communication, in addition to or in the alternative to wireless communications, which may include any type of transmission of data over a physical conduit, such as an electrical cable or optical fiber cable. Such wired communications technology include but are not limited to USB, ethernet, DALI, RS-232, RS-488, and DMX/RDM.

The controller 304 may execute code and process data received from other components of the sensor device 112-116, such as information received at the communication component 316 or stored at the memory component 306. The code associated with the lighting control system 100 and stored by the memory component 306 may include, but is not limited to, operating systems, sensor control applications, device drivers, and the like. The data associated with the lighting control system 100 and stored by the memory component 306 may include, but is not limited to, device groups, device profiles, environment profiles, incoming messages, outgoing messages, communication protocols, and the like.

For some embodiments, information for management of the lighting control system 100 may be stored at the memory component 306 of a sensor device 112-116. For these embodiments, one advantage is that a mobile device 120 may be easily added to, or replaced in, the device group of the building environment with minimal configuration. Another advantage is that sensor devices 112-116 may be easily added or replaced as well. Behavior and group information may be transferred from a sensor device 112-116 to a new device to facilitate and expedite the configuration process for the new device. Further, regarding these particular embodiments, the mobile device 120 may be needed for configuration of the lighting control system 100 and/or operation after configuration. In particular, a single mobile device 120 and its companion direction device 124 may be used program multiple sensor devices 112-116, 150 and/or multiple device groups. Once configured, the sensor devices 112-116, 150 may behave as a group and operate autonomously from the mobile device 120.

Each application includes executable code to provide specific functionality for the controller 304 and/or remaining components of the sensor device 112-116, 150. Examples of applications executable by the controller 304 include, but are not limited to, a commissioning module 308 and a sensor network module 310. The commissioning module 308 performs the operations necessary for commissioning the sensor device within the lighting control system 100, such as sending a response message in response to detecting a light beam from a directional device. The sensor network module 310 operates the sensor device in accordance with an assigned behavior of the sensor device and other sensor devices of a particular device group.

Data stored at the memory component 306 are information that may be referenced and/or manipulated by an operating system or application for performing functions of the sensor device 112-116, 150. Examples of data associated with the system 100 and stored by the memory component 306 may include, but are not limited to, messaging data 312 and behavior data 314. The messaging data 312 includes information about communicating with a mobile device via a wireless communication link, receiving a light beam via a directional link, and communication with other sensor devices of a sensor network via another wireless communication link. For example, the wireless communication link may be BLE, the light beam may be a green laser having a classification of Class 2 or higher, and the other wireless communication link for the sensor network may be based on 802.15.4 or a variant thereof. The behavior data 314 includes information about the operation of sensor device, received from the mobile device, based on the associated device group.

The components of each sensor 114 may further comprise one or more input/output (I/O) interfaces 318. The I/O interfaces 130 includes an ambient light sensor 320 to detect changes in the light level to determine if the sensor device 112-116, 150 has been strobed. The sensor 320 is configured to measure the current light level periodically, such as every 100 milliseconds. The sensor firmware, such as the commissioning module 308, configures the sensor 320 to generate an interrupt when measurement data for the next light measurement is available. Using the measurement data from the ambient light sensor 320, an interrupt service routine computes the light level measured at the sensor. For each light measurement, the interrupt service routine then wakes up a low-level task to process the light measurement. The low-level task then adjusts the measured light level to the actual light level by compensating for the light attenuation due to the sensor's physical characteristics, e.g., size of the lens, transmissivity of the lens, etc.

Using a circular buffer, the low-level task maintains the light level of the last group of samples, such as about 10 samples. For each light level sample, the current light level is compared to the light level of an earlier sample, such as a sample 2 periods earlier. If the current light level minus the light level of the earlier sample is greater than a specified threshold, and if the light source is determined to be a designated characteristic (such as from a green laser), then a strobe is reported. After a strobe detection, a hold off period (such as 4 samples) may be used to delay the start of the next strobe detection. This hold off period allows the ambient light sensor 320 sufficient time to recover after being strobed.

To minimize the number of strobe false alarms from ordinary light sources, the ambient light sensor 320 checks whether the light includes a designate characteristics, for example, from a light source such as a green laser. The ambient light sensor provides the light level of the individual color components, such as RGB. For example, in order to determine if the light is from a green laser, the sum of the three RGB components may be calculated and compared to the green component. If the ratio of the green component to the sum of the three RGB components is greater than a specified threshold, the strobing light source is assumed to be from a green laser. However, other sensors that do not provide RGB components could also be use, even sensor that go not provide any information about the spectrum of the light, but only it's amplitude can be used with suitable algorithms.

The I/O interfaces 318 may include various other types of sensor components, such as light sensors, motion sensors, temperature sensors, imaging sensors, and air quality sensors. For example, the sensor components may include a photosensors such as light pipe/photosensor array and/or a motion sensor such as digital passive infrared (PIR) sensor. Likewise, the I/O interfaces 318 may include other component associated with light fixture dimming, colored indicator light emitting diodes (LEDs), video, audio and/or mechanical inputs and outputs.

The components of each sensor device 112-116, 150 may further comprise a power source 322, such as an independent power source or a power supply coupled to main power of a building available in the building environment. The power source 322 may also provide power to the other device components of each sensor device 112-116, 150 of the system 100.

It is to be understood that FIG. 3 is provided for illustrative purposes only to represent examples of the sensor components 300 of the sensor device 112-116, 150 and is not intended to be a complete diagram of the various components that may be utilized by the system 100. Therefore, the sensor device 112-116, 150 may include various other components not shown in FIG. 3, may include a combination of two or more components, or a division of a particular component into two or more separate components, and still be within the scope of the present invention.

Referring to FIG. 4, there is shown a flow diagram depicting an example implementation of an operational procedure 400 that may employ techniques of a lighting control system 100 of a building environment. For ease of identifying, sensor devices 112-116, 150 that are uncommissioned will display a pattern indicating its state. This pattern could be displayed by using colored LEDs that are built into the sensor and/or it can brighten or dim the light fixture connected to the sensor. A commissioning agent selects one of these sensor devices 112-116, 150 for commissioning by strobing it with a directional device 124. Upon detecting a light beam, the uncommissioned sensor device 112-116, 150 will send a response message, such as a Discover Response Message. The application at the mobile device 120 recognizes the sensor device 112-116, 150 in response to the response messages so that this sensor device may be selected and assigned to an appropriate area, such as a room. Once all the sensor devices 112-116, 150 of a device group, such as devices located in the room, are added on the mobile application, the commissioning agent may configure the behavior of these sensors as a group.

The operation procedure 400 is a method for configuring a lighting control system 100 of a building environment. Sensor devices 112-116, 150 may be activated (410) in one or more areas of the building environment. For example, the sensor devices 112-116, 150 may be activated by providing power to them. By activating (410) the sensor devices 112-116, 150, the ambient light sensor 320 of each sensor devices 112-116, 150 may begin to detect current light levels on a periodic basis in a particular area and await detection of a light beam from a directional device 124. The sensor devices 112-116, 150 may also output a user observable pattern at each uncommissioned device indicating an operational state of the uncommissioned device.

Subsequent to activating (410) the sensor devices 112-116, 150, the mobile device 120 initiates (420) a configuration mode for commissioning sensor devices 112-116, 150 of one or more areas of the building environment. For example, the configuration mode may be initiated (420) by a mobile application operating at the mobile device 120 in response to a manual operation, an automatic operation by activation (410) of one or more sensor devices 112-116, 150, or an automatic operation in response to an operation by a remote device communicating with the mobile device.

In response to initiating (420) the configuration mode at the mobile device 120, the mobile device connects (430) to a first sensor device of the multiple sensor devices located in a particular area of the multiple areas of the building environment. A connection is formed between the mobile device 120 and the first sensor device sensor devices 114 via a wireless communication link 122. The mobile device 120 and/or the Cloud system 146 may communicate with each sensor device 112-116, 150 individually or establish multiple simultaneous links to multiple sensor devices to enhance connection quality.

Subsequent to, or in response to, connecting (430) the mobile device 120 to the first sensor device 112-116, 150, the directional device 124 that is associated with the mobile device sends or otherwise directs (440) a light beam to a select sensor device of the multiple sensor devices via a directional link. The select sensor device may be the first sensor device 114 having the wireless communication link 122 with the mobile device 120 or a second sensor device 112, 116, 150 of the sensor devices associated with the same particular area as the mobile device, e.g., located at the same area.

In response to the directional signal or the directional link 128 sent by the directional device 124, the mobile device 120 receives (450) a response message from the select sensor device. The mobile device 120 may receive the response message directly from the first sensor device 114 via the wireless communication link 112, or the mobile device may receive the response message indirectly from the first sensor device via one or more other sensor devices of the sensor network as well as the first sensor device connected to the wireless communication link. For some embodiments, the directional device 124 is associated with the mobile device by co-locating the directional device and the mobile device 120 in the particular area.

The mobile device 120 associates (460) the select sensor device with a device group corresponding to the particular area based on the response message. Each sensor device 112-116, 150 may be added to a device group managed by the mobile device 120 as response messages are received from the sensor device or a group of sensor devices may be added to the device group after response messages are receive from the group. Accordingly, the mobile device 120 may associate (460) the select sensor devices 112-116, 150 in response to receiving (450) each response message or in response to receiving (450) a group of response messages for a device group.

Once sensor devices 112-116, 150, in a particular area are associated with a device group, the mobile device 120 or commissioning agent may configure (470) the behavior of the sensors as a group. In particular, the mobile device 120 configures (470) the communication parameter for a sensor network including the select sensor devices 112-116, 150 located in the particular area as a group, in response to associating (460) the sensor devices with the device group. The mobile device 120 may also configure lighting control parameters for the lighting control system 100. For some embodiments, configuring the communication parameter includes transmitting data including the communication parameter from the mobile device 120 to the first sensor device 114 via, at least in part, by the wireless communication link in which the behavior includes a channel and network identification for communications within a sensor network. For some embodiments, configuring the communication parameter includes determining a parameter for wireless communications within a sensor network for a second wireless communication link of the sensor network different from the wireless communication link between the mobile device 120 and the first sensor device 114. For example, the mobile device 120 may receive Discover Response Messages from sensor devices 114-116, 150 of a device group and set wireless parameters for communication of a channel and personal area network identification to use for wireless communication in the sensor network. As a result, the wireless parameters may be applied to requires the sensor devices 114-116, 150 to start using the parameters for communication with each other within the sensor network.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A lighting control system of a building environment comprising:

a directional device directed to a select sensor device of a plurality of sensor devices via a directional link, the select sensor device being one of a first sensor device or a second sensor device of the plurality of sensor devices located in a particular area of the plurality of areas; and a mobile device connected to the first sensor device of the plurality of sensor devices via a wireless communication link, the mobile device receives a response message from the select sensor device to the mobile device via at least in part by the wireless communication link in response to the directional device directing a directional link to the select sensor device, associates the select sensor device with a device group corresponding to the particular area based on the response message, and configures a communication parameter for a sensor network including the plurality of sensor devices as a group in response to associating the plurality of sensor devices with the device group.

2. The system as described in claim 1, wherein the plurality of sensor devices of the lighting control system are located and activated in the plurality of areas of the building environment, each sensor device including an ambient light sensor to detect light levels in the particular area of the plurality of areas for the lighting control system and a sensor communication component to communicate in a sensor network of the plurality of sensor devices in the plurality of areas via the wireless communication link.

3. The system as described in claim 2, wherein each uncommissioned device includes a user observable pattern indicating an operational state of the uncommissioned device.

4. The system as described in claim 1, wherein the directional device is associated with the mobile device by co-locating the directional device and the mobile device in the particular area of the plurality of areas.

5. The system as described in claim 1, wherein the mobile device receives the response message via by a sensor network of the plurality of sensor devices and the wireless communication link.

6. The system as described in claim 1, wherein the mobile device configures the communication parameter by transmitting data including the communication parameter from the mobile device to the first sensor device via, at least in part, by the wireless communication link, the behavior including a channel and network identification for communications within the sensor network.

7. The system as described in claim 1, wherein:

the wireless communication link is a first wireless communication link; and the mobile device configures the communication parameter by determining a parameter for wireless communications within the sensor network for a second wireless communication link of the sensor network different from the first wireless communication link.

8. A method for configuring a lighting control system of a building environment, the method comprising:

connecting a mobile device and a first sensor device of a plurality of sensor devices located in a particular area of a plurality of areas via a wireless communication link;

directing a directional link from a directional device to a select sensor device of the plurality of sensor devices subsequent to connecting the mobile device and the first sensor device via the wireless communication link, the select sensor device being one of the first sensor device or a second sensor device of the plurality of sensor devices located in the particular area of the plurality of areas;

receiving a response message from the select sensor device to the mobile device via, at least in part, by the wireless communication link in response to directing the directional link to the select sensor device via the directional link;

associating the select sensor device with a device group corresponding to the particular area based on the response message; and configuring a communication parameter for a sensor network including the plurality of sensor devices as a group in response to associating the plurality of sensor devices with the device group.

9. The method as described in claim 8, further comprising activating the plurality of sensor devices of the lighting control system located in the plurality of areas of the building environment, each sensor device including an ambient light sensor to detect light levels in the particular area of the plurality of areas for the lighting control system and a sensor communication component to communicate in a sensor network of the plurality of sensor devices in the plurality of areas via the wireless communication link.

10. The method as described in claim 9, wherein activating the plurality of sensor devices including outputting a user observable pattern at each uncommissioned device indicating an operational state of the uncommissioned device.

11. The method as described in claim 8, wherein the directional device is associated with the mobile device by co-locating the directional device and the mobile device in the particular area of the plurality of areas.

12. The method as described in claim 8, wherein receiving the response message includes receiving the response message via by a sensor network of the plurality of sensor devices and the wireless communication link.

13. The method as described in claim 8, wherein configuring the communication parameter includes transmitting data including the communication parameter from the mobile device to the first sensor device via, at least in part, by the wireless communication link, the data including a channel and network identification for communications within the sensor network.

14. The method as described in claim 8, wherein:

the wireless communication link is a first wireless communication link; and configuring the communication parameter including determining the communication parameter for wireless communications within the sensor network for a second wireless communication link of the sensor network different from the first wireless communication link.

15. A mobile device for configuring a lighting control system of a building environment comprising:

a communication component of the mobile device, the communication component having a wireless communication link with a first sensor device of a plurality of sensor devices and receiving a response message from a select sensor device of the plurality of sensor devices via, at least in part, by the wireless link, the communication component receiving the response message in response to a directional device directing a directional link to the select sensor device, the select sensor device being one of the first sensor device or a second sensor device of the plurality of sensor devices located in a particular area of a plurality of areas; and a controller coupled to the communication component, the controller associating the select sensor device with a device group corresponding to the particular area based on the response message, and configuring a communication parameter for a sensor network including the plurality of sensor devices as a group in response to associating the plurality of sensor devices with the device group.

16. The mobile device as described in claim 15, wherein the mobile device is co-located with the directional device in the particular area of the plurality of areas.

17. The mobile device as described in claim 15, wherein the mobile device receives the response message via by a sensor network of the plurality of sensor devices and the wireless communication link.

18. The mobile device as described in claim 15, wherein the mobile device configures the communication parameter by transmitting data including the communication parameter from the mobile device to the first sensor device via, at least in part, by the wireless communication link, the data including a channel and network identification for communications within the sensor network.

19. The mobile device as described in claim 15, wherein:

the wireless communication link is a first wireless communication link; and the mobile device configures the communication parameter by determining a parameter for wireless communications within the sensor network for a second wireless communication link of the sensor network different from the first wireless communication link.

* * * * *